(12) United States Patent
Suthar (10) Patent No.: US 10,002,318 B1
(45) Date of Patent: Jun. 19, 2018

(54) TRANSACTION CARD HAVING INTERNAL LIGHTING

(71) Applicant: Capital One Services, LLC, McLean, VA (US)

(72) Inventor: Om J. Suthar, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/691,079

(22) Filed: Aug. 30, 2017

Related U.S. Application Data (60) Provisional application No. 62/432,154, filed on Dec. 9, 2016.

(51) Int. Cl.
| | |
|---|---|
| G06K 19/00 | (2006.01) |
| G06K 19/07 | (2006.01) |
| G06K 19/077 | (2006.01) |

(52) U.S. Cl.
CPC ... *G06K 19/0723* (2013.01); *G06K 19/07722* (2013.01)

(58) Field of Classification Search
USPC .................................... 235/487, 492
See application file for complete search history.

(56) References Cited

U.S. PATENT DOCUMENTS

2010/0270373 A1* 10/2010 Poidomani ......... G06K 19/0702
235/380

* cited by examiner

*Primary Examiner* — Matthew Mikels
(74) *Attorney, Agent, or Firm* — Finnegan, Henderson, Farabow, Garrett & Dunner LLP (57) ABSTRACT

A transaction card construction and a method for making a transaction card are described. The transaction card construction comprises an inlay component and a housing component. The inlay component may comprise a light-penetrable layer and a backer layer. A light source may be disposed on or in the housing component, and the housing component and the inlay component may be joined such that light emitted by the light source passes through the inlay component.

20 Claims, 10 Drawing Sheets

TRANSACTION CARD HAVING INTERNAL LIGHTING

RELATED APPLICATIONS

This application claims priority to U.S. Provisional Patent Application No. 62/432,154, filed Dec. 9, 2016. The contents of that application are hereby incorporated by reference in their entirety.

DESCRIPTION

Technical Field

The disclosed embodiments generally relate to transaction cards, and more particularly, to transaction cards having internal lighting.

BACKGROUND

Transaction cards, such as credit and debit cards, have become a primary means for individuals to complete transactions involving data exchange. Traditional transaction cards are constructed in a sheeted laminate press. The shape of the card is die cut and then the card is personalized. Typically, transaction cards are cut from laminated sheets of polyvinyl chloride (PVC) or polycarbonate (PC), or other similar materials. After the overall shape of the card is formed, the card may be modified to add functional and/or visual features. For example, a magnetic strip and/or microchip may be affixed to one side, the card may be stamped with the card number and customer name, and color or a design may be added for appearance.

In addition, as transaction cards increase in prevalence, expectations for transaction card quality have increased. Transaction cards have increasingly been made to meet higher standards regarding materials, durability, security, and appearance. Further, traditional card manufacturing methods, which have employed limited card construction techniques and materials, continue to utilize techniques and materials that restrict variations in card style and appearance.

The present disclosure is directed to improvements in transaction cards.

SUMMARY

The disclosed embodiments relate to a transaction card and a process/method for constructing the transaction card, wherein the transaction card includes an internal light source on or in a housing component.

Consistent with a disclosed embodiment, a transaction card may include a housing component having a first housing surface, and a second housing surface opposite the first housing surface. The card may further include a light source disposed on or in the card housing. The card may further include an inlay component having a first inlay surface, and a second inlay surface opposite the first inlay surface. The housing and the inlay component may be joined at the first housing surface and the second inlay surface such that light emitted by the light source passes through the inlay component.

Consistent with another disclosed embodiment, a method/process of manufacturing a transaction card may include forming a housing component having a first housing surface, and a second housing surface opposite the first housing surface. The method may further include providing a light source disposed on or in the housing component. The method may further include forming an inlay component having a first inlay surface, and a second inlay surface opposite the first inlay surface. The method may further include joining the housing component and the inlay component at the first housing surface and the second inlay surface such that light emitted by the light source passes through the inlay component.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

The term "transaction card," as used herein may refer to a physical card product that includes features to provide transaction information. As used herein, the term "personal information" may include information that is associated with a user of the card or information associated with an account of/for the card user. In some embodiments, personal information may include "transaction information," such as financial information (e.g., card numbers, account numbers, expiration dates, etc.), quasi-financial information (e.g., rewards balance, discount information, etc.), individual-identifying information (e.g., name, address, etc.), bank information, and/or transaction network information. Examples of transaction cards include credit cards, debit cards, gift cards, rewards cards, frequent flyer cards, merchant-specific cards, discount cards, identification cards, membership cards, and driver's licenses, but are not limited thereto. The physical properties of the transaction card (e.g., size, flexibility, location of various components included in the card) may meet the various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, a transaction card may have a dimension of 85.60 mm (width) by 53.98 mm (height) by 0.76 mm (thickness), as specified in ISO/IEC 7810.

Disclosed embodiments include transaction cards and methods for manufacturing a transaction card. For example, disclosed embodiments include a transaction card having a housing component configured to house an inlay component, wherein the inlay component may include a light-penetrable layer and a backer layer joined to the light-penetrable layer. A light source or sources may be disposed on or in the housing component, and the housing component and inlay component may be joined such that light emitted by the light source(s) passes through the inlay component.

The light source may be configured to emit light from the card. For example, the light source may be positioned on or in the card and configured to emit light outwardly or away from the card. In some embodiments, the light source may be configured to emit light through a light-penetrable component of the card. For example, the light source may be configured to emit light for passage through one or more transparent, translucent, or non-opaque component(s) or subcomponent(s) of the card. The light source may also or alternatively be configured to emit light from a space, cavity, or compartment defined by one or more components or features of the card.

In some embodiments, the light source may be a light emitting diode. Additionally, in some embodiments, the light source may be disposed between the first housing surface and the inlay component to permit light emitted by the light source to pass through the inlay component.

The inlay component may include a light-penetrable layer and a backer layer joined to the light-penetrable layer. The backer layer may provide structural support to the light-penetrable layer. In some embodiments, the light source may be disposed between the light-penetrable layer and the backer layer.

The housing component may also include a cavity having a cavity wall. In some embodiments, the light source may be disposed between the cavity wall and the inlay component.

In some embodiments, the card may further include a switch electronically connected to the light source. The switch may be configured to activate and deactivate the light source.

The card may further include a power source disposed on or in the card housing. The power source may be configured to supply power to the light source. In some embodiments, the power source may be a rechargeable power source. In some embodiments, the light source may be a light emitting diode (LED). In other embodiments, the light source may be a photoluminescent material.

The light-penetrable layer may comprise transaction information. In some embodiments, the transaction information may be visible to users when the light source is activated or when the light source is deactivated. The visibility and/or appearance of the transaction information may be enhanced or modified when the light source is activated.

Figure 1:
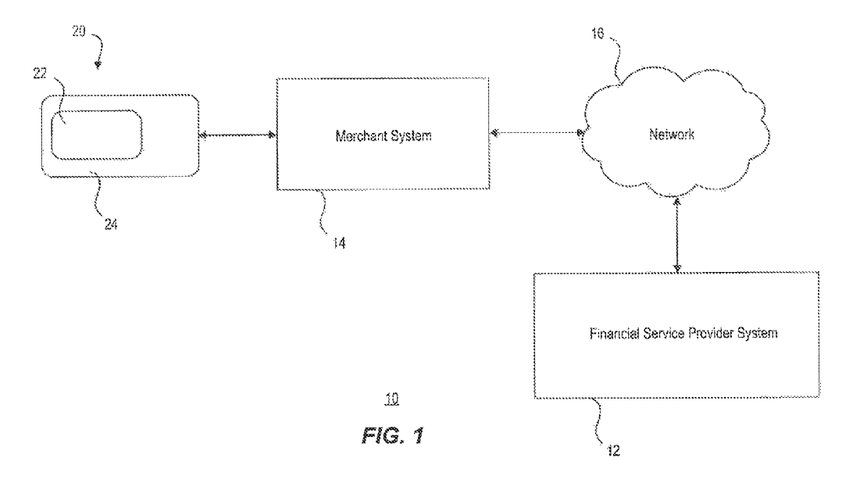
FIG. 1 is a block diagram of an exemplary transaction system, consistent with disclosed embodiments.

FIG. 1 illustrates an exemplary transaction system 10. Transaction system 10 may include a computing system configured to receive and send information between the components of transaction system 10 and components outside of transaction system 10. Transaction system 10 may include a financial service provider system 12 and a merchant system 14 communicating with each other through a network 16. Transaction system 10 may include additional and/or alternative components.

Financial service provider system 12 may include one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and other types of financial service accounts. Financial service accounts may be associated with physical financial service transaction cards, such as credit or debit cards that customers use to perform financial service transactions, such as purchasing goods and/or services online or at a point of sale (POS) terminal. Financial service accounts may also be associated with electronic financial products and services, such as a digital wallet or similar account that may be used to perform electronic transactions, such as purchasing goods and/or services online.

Merchant system 14 may include one or more computer systems associated with a merchant. For example, merchant system 14 may be associated with an entity that provides goods and/or services (e.g., a retail store). The merchant may include brick-and-mortar location(s) that a customer may physically visit and purchase goods and services using the transaction cards. Such physical locations may include computing devices (e.g., merchant system 14) that perform financial service transactions with customers (e.g., POS terminal(s), kiosks, etc.). Additionally or alternatively, merchant system 14 may be associated with a merchant who provides an electronic shopping environment, such as a website or other online platform that consumers may access using a computer through a browser, a mobile application, or similar software. Merchant system 14 may include a client device, such as a laptop computer, desktop computer, smart phone, or tablet, which a customer may operate to access the electronic shopping mechanism.

Network 16 may include any type of network configured to facilitate communications and data exchange between components of transaction system 10, such as, for example, financial service provider system 12 and merchant system 14. Network 16 may include, but is not limited to, Local Area Networks (LANs) and Wide Area Networks (WANs), such as the Internet. Network 16 may be a single network or a combination of networks. Network 16 is not limited to the above examples and transaction system 10 may implement any type of network that allows entities (shown and not shown) of transaction system 10 to exchange data and information.

Transaction system 10 may be configured to conduct a transaction using a transaction card 20. In some embodiments, financial service provider system 12 may provide transaction card 20 to a customer for use in conducting transactions associated with a financial service account held by the customer. For example, the customer may use transaction card 20 at a merchant location to make a purchase. During the course of the purchase, information may be transferred from transaction card 20 to merchant system 14 (e.g., a point of sale device). Merchant system 14 may communicate with financial service provider system 12 via network 16 to verify the information and to complete or deny the transaction. For example, merchant system 14 may receive account information from transaction card 20. Merchant system 14 may transmit the account information and a purchase amount, among other transaction information, to financial service provider system 12. Financial service provider system 12 may settle the transaction by transferring funds from the customer's financial service account to a financial service account associated with the merchant.

While transaction system 10 and transaction card 20 are depicted and described in relation to transactions that involve customers, merchants, and financial service providers, it should be understood that these entities are used only as an example to illustrate one environment in which transaction card 20 may be used. Transaction card 20 is not limited to financial products and may be any physical card product that is configured to store and/or transmit information. For example, transaction card 20 may be an identification card configured to provide information to a device in order to identify the holder of the card (e.g., a driver's license).

In some embodiments, transaction card 20 may further include a data storage component 22 disposed on or in a transaction card frame ("frame") 24. As used herein, a "data storage component" may be one or more devices and/or elements configured to receive, store, process, provide, transfer, send, delete, and/or generate information. For example, data storage component 22 may be a microchip (e.g., a Europay, MasterCard, and Visa (EMV) chip), a communication device (e.g., Near Field Communication (NFC) antenna, Bluetooth® device, WiFi device), a magnetic strip, a barcode, Quick Response (QR) code, etc. Data storage component 22 may be secured (or affixed, attached) to frame 24 in such a way that allows frame 24 to carry data storage component 22 while maintaining a utility of data storage component 22 (i.e., allowing data storage component 22 to interact with merchant system 14). Data storage component 22 may be configured to ensure that data storage component 22 functions properly during data storage and transmission; for example, ensuring that a card containing an RFID (radio frequency identification) device shielded by a material layer can still be properly read by an RFID reader through the material layer.

Figure 2A:
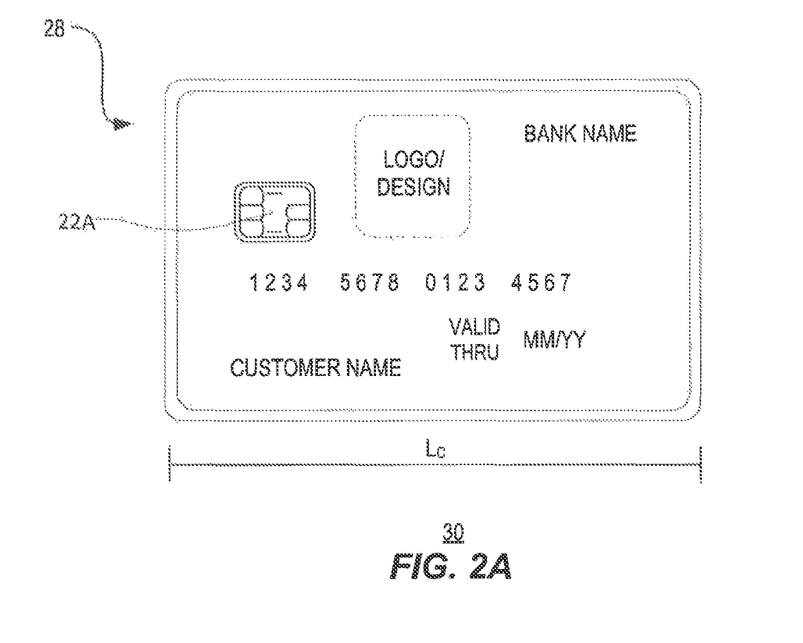
FIG. 2A is a front view of an exemplary transaction card, consistent with disclosed embodiments.
Figure 2B:
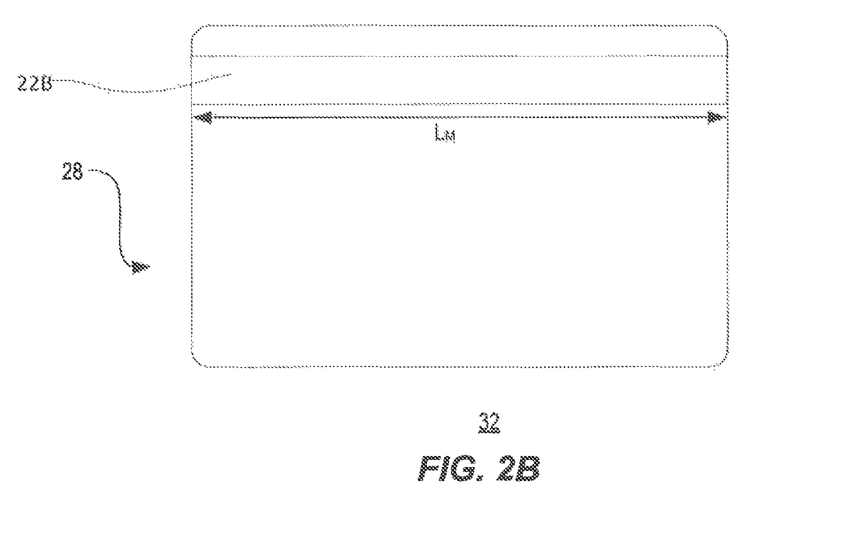
FIG. 2B is a back view of the exemplary transaction card of FIG. 2A, consistent with disclosed embodiments.

FIGS. 2A and 2B are front and rear views, respectively, of an exemplary transaction card 28 with a first data storage component 22A (e.g., a microchip) and a second data storage component 22B. FIG. 2A shows a front surface 30 of card 28 with a length defined as $L_c$, and FIG. 2B shows a rear surface 32 of card 28, with data storage component 22B exposed (i.e., a magnetic strip in this exemplary embodiment). The magnetic strip may have a length $L_m$ which may be equal to or less than the card length $L_c$, and may be flush with rear surface 32.

In some embodiments, visual details, such as transaction information, aesthetic designs, images, etc., may be visible from a first side 30 of card 28. For example, a customer name, an account number, date information, bank information, transaction system information (e.g. Visa, MasterCard, etc.), a design or logo, a signature associated with the customer, and/or other information may be visible from first side 30. In some embodiments, visual information may also or alternatively be visible from second side 32 of card 28. Such visual details may be generated during a process of forming the card (e.g., pressing, laminating, injection molding, etc.) or during a process subsequent to card formation (e.g., milling, laser cutting, etching, stamping, etc.). In some embodiments, such visual details may be included on one or more surfaces of transaction card 28 and visible from first and/or second side 30, 32.

Figure 3:
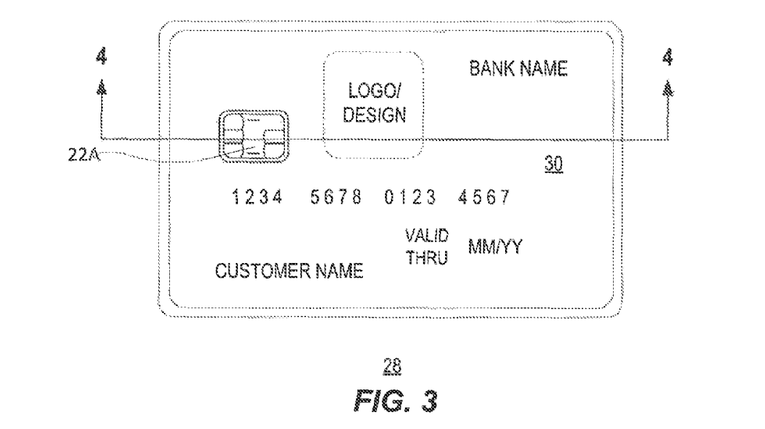
FIG. 3 is a front view of an exemplary transaction card showing section line 4-4, consistent with disclosed embodiments.
Figures 4A, 4B:
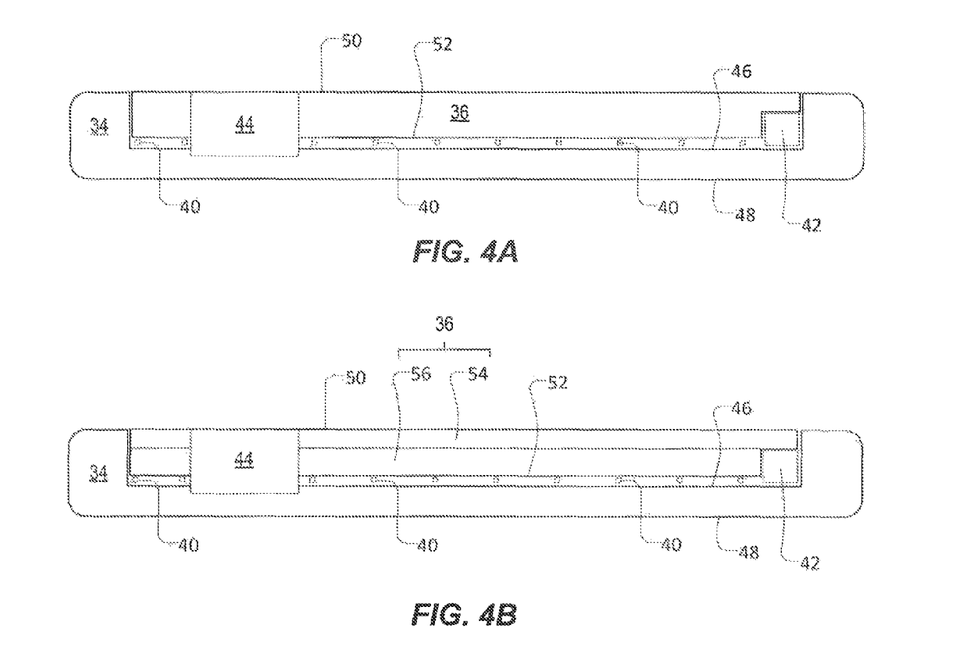
FIG. 4A is a cross-sectional view of the exemplary transaction card of FIG. 3 along section line 4-4, consistent with disclosed embodiments.
FIG. 4B is another cross-sectional view of the exemplary transaction card of FIG. 3 along section line 4-4, consistent with disclosed embodiments.

FIG. 3 illustrates card 28 with a section line 4-4 along its length. FIG. 4A is a magnified cross-sectional view of card 28 along line 4-4. As shown, card 28 may include a housing component (or "housing") 34, an inlay component (or "inlay") 36, one or more light sources 40, and a power source 42 electronically connected to the light sources 40. Power source 42 may be configured to supply electrical power to light sources 40, which may be configured to emit light through inlay 36. Housing 34 and/or inlay 36 may include a recess 44 configured to house and expose data storage device 22A. As used herein, the term "inlay" may refer to material or a component set into a surface of another material or component.

Housing 34 may be made of PVC, PC, or other similar materials, and may be manufactured using a molding process, such as an injection-molding process or a compression-molding process. In other embodiments, housing 34 may be formed of a resin mixture comprising one or more of a thermoplastic elastomer (TPE), polybutylene terephthalate (PBT), an acetal homopolymer, and/or other materials. In some embodiments, the TPE and/or other materials may be selected to provide card 28 with a "soft-touch feel" (i.e., a haptic sensation that occurs when a person touches something that, for example, feels soft, smooth, and/or satiny). In some embodiments, the resin mixture may include a polyester elastomer, a block copolymer, a thermoplastic olefin, an elastomeric alloy, a thermoplastic polyurethane, a thermoplastic copolyester, or a thermoplastic polyamide. In some embodiments, housing 34 may be non-opaque (e.g., translucent, transparent, clear, etc.). That is, housing 34 may be formed of a material that is non-opaque after manufacturing is complete (e.g., after setting).

Inlay 36 may be a light-penetrable inlay. That is, inlay 36 may be configured to allow light to pass therethrough (i.e., a device through which visible light may pass). In some embodiments, inlay 36 may be clear, transparent, or translucent. In some embodiments, light passing through inlay 36 may be diffused to achieve desired aesthetic and/or operational requirements. That is, inlay 36 may have light-diffusing properties or be a light-diffusing layer. In some embodiments, inlay 36 may be backlit by light sources 40 to produce a desired aesthetic appearance of card 28 (e.g., to cause card 28 to appear "lit up" and/or to cause visual details on card 28 to become visible or appear differently when backlit or edge lit).

Light diffusing properties of inlay 36 may function to spread light emitted by light sources 40 across inlay 36 to create a more even distribution of light intensity, as seen by a card user through inlay 36. In this way, desired lighting characteristics may be achieved while reducing the appearance of localized higher-intensity light (or "hot spots") caused by light sources 40 (e.g., sources of direct light, such as LEDs). The light diffusing function of inlay 36 may also permit for edge-lighting of inlay 36 (discussed further below), which may require fewer light sources 40 than backlighting configurations, thereby reducing the cost of card 28 and improving its operating efficiency.

As shown in FIG. 4A, housing 34 may include a first housing surface 46, and a second housing surface 48 opposite the first housing surface 46. Inlay 36 may include a first inlay surface 50, and a second inlay surface 52 opposite the first inlay surface 50. Light sources 40 may be disposed on or in card housing 36 and configured to emit light through inlay 36 (i.e., when energized or powered by power source 42). Housing 34 and inlay 36 may be joined via first housing surface 46 and second inlay surface 52 such that light emitted by light source(s) 40 passes through inlay 36. That is, first housing surface 46 and second inlay surface 52 may be adjacent and/or in contact with one another when housing 34 and inlay 36 are joined. For example, housing 34 and inlay 36 may be joined using an adhesive material, interconnecting features (e.g., snap fit, tongue and groove, etc.), fasteners (e.g., screws, nuts, bolts, rivets, etc.), and/or other joining mechanisms or techniques.

Light source 40 may be an electronic, photoluminescent (i.e., "glow in the dark"), or other type of device configured to emit light. For example, in some embodiments, light source 40 may be a light emitting diode (LED). Suitable LEDs may be selected based on, among other factors, size limitations, color requirements, and power usage limitations. For instance, card 28 may have an overall thickness of 0.030 inches (0.762 mm) (e.g., pursuant to ISO standards for transaction card thickness), and therefore a relatively small LED may be used as light source 40. For example, LEDs having a footprint of the standard size 0201 (0.002×0.001×0.001 inches) may be suitable for use in card 28. It is noted that other LEDs of different sizes may be used, depending on the dimensions of the LED and/or the dimensions of the card components (e.g., housing 34, inlay 36, etc.). It should be noted that light source 40 may be or include other types of electronic light sources, such as light bulbs (e.g., incandescent, fluorescent, halogen, etc.). Size and power constraints may dictate the types of electronic light sources that can be used with card 28 as light source 40.

In other embodiments, photoluminescent materials may be used as light source 40. For example, light source 40 may be or include a photoluminescent coating, such as a photoluminescent epoxy or paint. In other embodiments, a photoluminescent pigment or other photoluminescent material may be added to inlay 36 during its formation. Suitable photoluminescent materials may be those that store light photons when exposed to an external light source (e.g., ambient light, direct sunlight, another light source, etc.) and continue to emit light after exposure to the light source has ended.

When multiple light sources 40 are used, one or more colors of light sources 40 (i.e., light sources that emit different colors) may be implemented, depending on design and utility requirements. For example, in some embodiments, light sources 40 may be all the same color (e.g., red, orange, yellow, green, blue, etc.). In other embodiments, light sources 40 configured to emit different colors of light may be installed to generate desired patterns of colored light for aesthetic or functional purposes. For example, in some embodiments, LEDs of different colors may be configured to indicate the voltage or state of charge (SOC) of power source 42. In an exemplary embodiment, an LED of a first color (e.g., green) may be configured to be energized when power source 42 is above a first voltage or SOC. An LED of a second color (e.g., yellow) may be configured to be energized when power source 42 is above a second and below the first voltage or SOC. An LED of a third color (e.g., red) may be configured to be energized when power source 42 is below the second voltage or SOC. It is noted that other types of information may be indicated based on the location, color, flashing pattern, etc., of light sources 40.

In some embodiments, as shown in FIG. 4A, inlay 36 may be comprised of a single-layer. In other embodiments, inlay 36 may be formed of multiple components (e.g., multiple layers). For example, as shown in FIG. 4B, inlay 36 may include a light-penetrable layer 54 and a backer layer 56 (serving as structural backing support for layer 54). Light-penetrable layer 54 and backer layer 56 may be joined by a suitable joining or fastening mechanism that permits light to pass from second inlay surface 52 to first inlay surface 50. For example, Light-penetrable layer 54 and backer layer 56 may be joined by an adhesive layer (not shown), which may be, for example, 1 mil or greater in thickness (depending on the overall thickness of card 28 and the thicknesses of light-penetrable layer 54 and backer layer 56, and on the requirements of the adhesive).

In some embodiments, light-penetrable layer 54 may be or include a light diffuser material, such as a light diffuser film. For example, light-penetrable layer 54 may be a one- or two-sided diffuser film configured to distribute light evenly across its surface. Each respective side of the light diffuser material may be clear, translucent, or have a matte finish. In some embodiments, the light diffuser material may comprise multiple layers, such as guide layers, diffusion layers, prism layers, etc.

In other embodiments, light-penetrable layer 54 may be clear, transparent, translucent, tinted, polarized, textured, hazed, colored, or otherwise configured to affect (or not affect) light passing therethrough. In some embodiments, light-penetrable layer 54 may have a reflective backing. That is, light-penetrable layer 54 may be adjacent a reflective material, such as a mirror, polished metal, metal-coated or metal-plated material, a coated or otherwise reflective glass or plastic material, etc. A reflective backing may reflect back light passing through light-penetrable layer 54 to enhance or brighten the appearance of card 28.

The thickness of light-penetrable layer 54 may be selected based on desired light-altering performance, the thickness of backer layer 56, and/or structural requirements of inlay 34. For example, light-penetrable layer may be from 3 mils (i.e., 3/1000 of an inch) to 20 mils thick, depending on the thickness of backer layer 56 and/or other components. Light-penetrable layer 54 may be, for example, from 3 to 20 mils, from 3 to 15 mils, from 3 to 10 mils, from 3 to 5 mils, or less than 3 mils thick.

In some embodiments, light-penetrable layer 54 may be formed using a lamination, injection molding, compression injection, sheet forming, or other process. In some embodiments, light diffusing materials, such as acrylic, polycarbonate (PC), polyethylene terephthalate (PET), and/or other materials may be used to form light-penetrable layer 54. In other embodiments, light-penetrable layer 54 may be or include one or more commercially available materials. For example, light-penetrable layer 54 may be cut from a roll or sheet of light-penetrable commercially available material. Cutting, stamping, milling, laser cutting, and/or other processes may be used to form light-penetrable layer 54 from rolls or sheets of commercially available light-penetrable material.

In some embodiments, light-penetrable layer 54 may be configured to polarize light generated by light source 40 to alter the appearance of passing light and/or to provide a privacy function. For example, light-penetrable layer 54 may be configured to restrict the angle at which visible light is emitted from inlay 36 (e.g., to reduce visibility of details on card 28 from peripheral vantage points). To achieve polarizing functionality, light-penetrable layer 54 may, for example, include polarizing materials or a polarizing layer.

Backer layer 56 may be a structural layer configured to support light-penetrable layer 54 and facilitate the joining of inlay 36 to housing 34. In some embodiments, backer layer 56 may be formed of particular materials or be sized to improve the mechanical properties of card 28. For example, backer layer 56 may be formed of stiffer, less flexible, and/or more dense materials than light-penetrable layer 54. Backer layer 56 may be formed of, for example, injection molded plastic, polycarbonate, acrylic, and/or other materials. The thickness of backer layer 56 may be selected based on the overall thickness of card 28 (e.g., 30 mils) and may range from 10-20 mils, depending on the thicknesses of housing 34 and light-penetrable layer 54. For example, backer layer 56 may be less than 20 mils, 10-20 mils, 12-18 mils, 14-16 mils, 15 mils, or greater than 10 mils in thickness.

Figure 5:
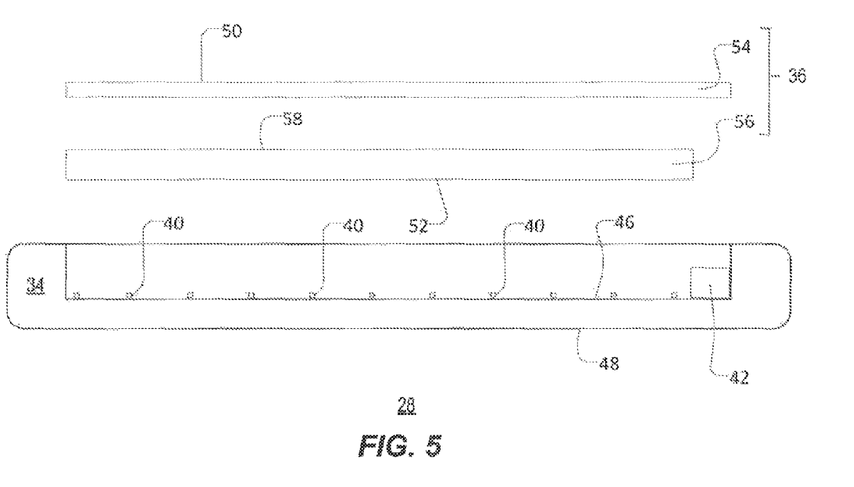
FIG. 5 is an exploded cross-sectional view of an exemplary transaction card, consistent with disclosed embodiments.

With reference to FIG. 5, some embodiments of card 28 may be configured such that light source(s) 40 is/are disposed between housing 34 and inlay 36. For example, FIG. 5 shows a partially disassembled, magnified cross-sectional view of card 28, in which light sources 40 are disposed between first housing surface 46 and inlay 36 (e.g., second inlay surface 52 of inlay 36). In embodiments consistent with the example of FIG. 5, backer layer 56 may be non-opaque (i.e., formed of non-opaque material) to permit light to travel through backer layer 56, and thus through inlay 36.

In the configuration of the exemplary embodiment of FIG. 5, visual details of card 28, such as transaction information (e.g., card number, customer name, logos, etc.), may be included on backer layer 56, which may be visible by the user through inlay 36 and/or made more visible (or appear differently) when light source(s) 40 is/are emitting light. For example, a top surface 58 of backer layer 56 may be etched, sanded, laser-etched, carved, printed, milled, stamped, or otherwise processed to include visual details that are configured to be or become visible through inlay 36 when light source(s) 40 is/are energized. In embodiments consistent with the example of FIG. 5, light-penetrable layer 56 may also or alternatively be processed to include visual details.

Figure 6:
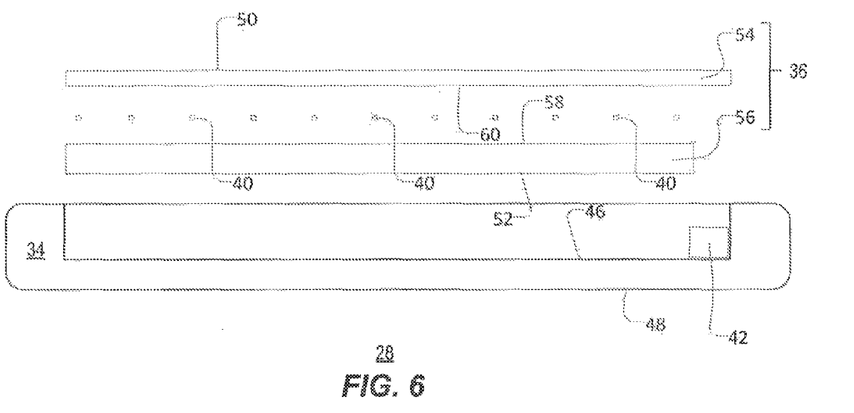
FIG. 6 is another exploded cross-sectional view of an exemplary transaction card, consistent with disclosed embodiments.

With reference to FIG. 6, some embodiments of card 28 may be configured such that light source(s) 40 is/are disposed between light-penetrable layer 54 and backer layer 56. For example, FIG. 6 shows a partially disassembled, magnified cross-sectional view of card 28, in which light sources 40 are disposed between top surface 58 of backer layer 56 and a bottom surface 60 of light-penetrable layer 54. In embodiments consistent with the example of FIG. 6, backer layer 56 may be non-opaque, opaque, and/or reflective (i.e., is formed of or includes reflective material). For example, top surface 58 of backer layer 56 may include a reflective coating or be covered with a layer of reflective material (e.g., metal, metallic coating, reflective spray or film, etc.) to reflect light through light-penetrable layer 54.

In the configuration of the exemplary embodiment of FIG. 6, visual details of card 28, such as transaction information (e.g., card number, customer name, logos, etc.), may be included or formed on or in the top or bottom surface of light-penetrable layer 54 (i.e., on first inlay surface 50 or bottom surface 60 of light-penetrable layer, respectively). In this way, visual details of card 28 may be visible by the user through inlay 36 and/or made more visible (or appear differently) when light source(s) 40 is/are energized (i.e., emitting light). Light-penetrable layer 54 may be etched, sanded, laser-etched, carved, printed, milled, stamped, or otherwise processed to include visual details that are configured to be or become visible through inlay 36 when light source(s) 40 is/are energized.

Figure 7A:
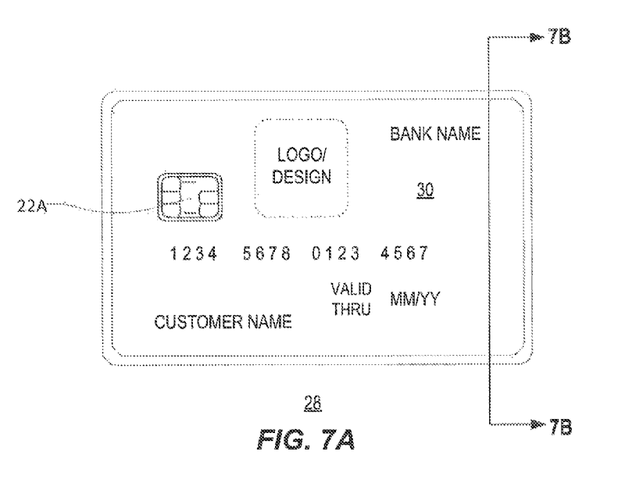
FIG. 7A is a front view of an exemplary transaction card showing section line 7B-7B, consistent with disclosed embodiments.
Figure 7B:
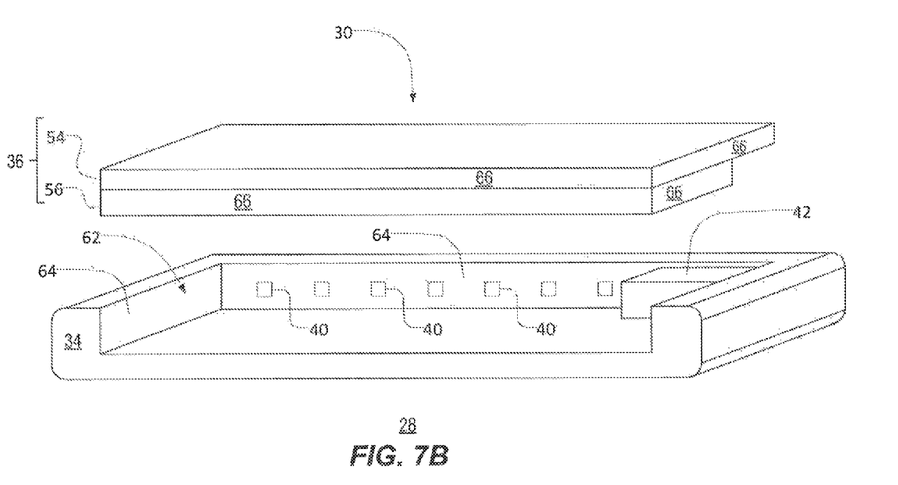
FIG. 7B is an exploded isometric cross-sectional view of the exemplary transaction card of FIG. 7A taken along section line 7B-7B, consistent with disclosed embodiments.

FIG. 7A illustrates card 28 with a section line 7B-7B along its width. FIG. 7B is a magnified, partially disassembled, isometric cross-sectional view of card 28 along line 7B-7B. In embodiments consistent with the example of FIG. 7B, housing 34 may include a cavity 62 having a cavity wall 64. Inlay 36 may be configured to fit into or be positioned within cavity 62 such that a side portion 66 of inlay 36 (e.g., a side portion of light-penetrable layer 54 and/or backer layer 56) is adjacent cavity wall 64. Light source(s) 40 may also be positioned on or on or in (e.g., recessed into) cavity wall 64. In this way, light source(s) 40 may be configured to project (i.e., emit) light laterally through inlay 36. Laterally projected light from light source(s) 40 may be distributed and/or scattered throughout inlay 36 to achieve a more even light distribution across front surface 30 of card 28. In other words, light source(s) 40 may be configured to edge-light inlay 36. Edge-lighting may permit for fewer light sources 40 to be used, thereby reducing the cost and increasing the efficiency of card 28.

Figure 8:
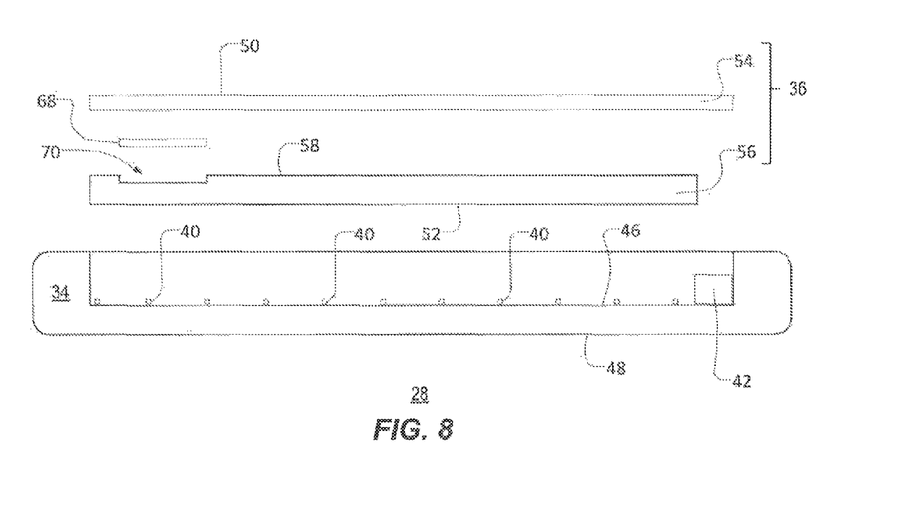
FIG. 8 is an exploded cross-sectional view of an exemplary transaction card, consistent with disclosed embodiments.
Figure 9:
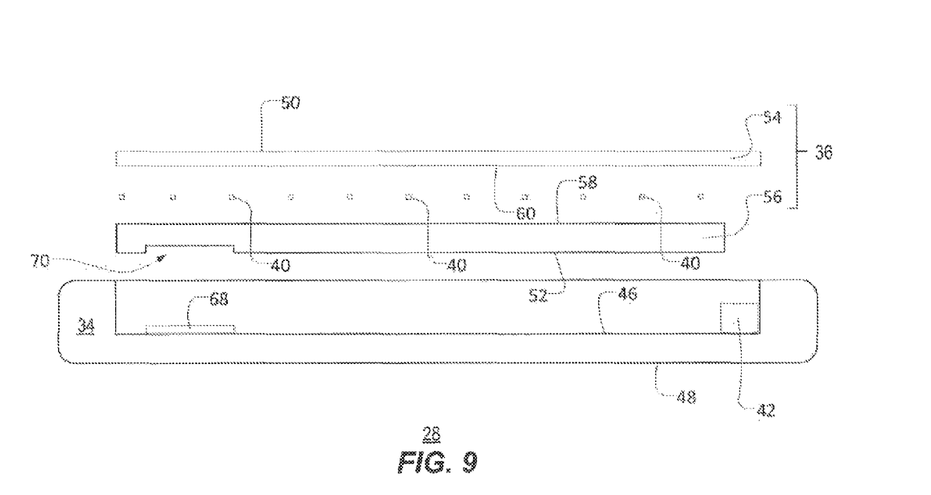
FIG. 9 is another exploded cross-sectional view of an exemplary transaction card, consistent with disclosed embodiments.

In some embodiments, as shown in FIGS. 8 and 9, card 28 may include a switch 68 configured to activate and deactivate the light source(s) 40. With reference to FIG. 8, in some embodiments, switch 68 may be disposed between light-penetrable layer 54 and backer layer 56. For example, switch 68 may be disposed in a recess 70 on top surface 58 of backer layer 56. In other embodiments, switch 68 may be disposed directly on top surface 56 of backer layer 56 (i.e., not within a recess). Switch 68 may be a pressure switch (i.e., a pressure-sensitive or pressure-activated switch) configured to activate light source(s) 40 when a user presses on card 28 (e.g., presses inlay 36 and housing 34 together). For instance, inlay 36 (i.e., light-penetrable layer 54 and/or backer layer 56) may be configured to flex under pressure applied to card 28, thereby exerting a force on switch 68 sufficient to energize light source(s) 40. In other embodiments, switch 68 may be a touch sensor (e.g., a capacitive-type touch sensor) positioned at or sufficiently near first inlay surface 50 to detect when a user touches switch 68 (i.e. to activate light source(s) 40).

In other embodiment, with reference to FIG. 9, switch 68 may be disposed between housing 34 and inlay 36. For example, switch 38 may be disposed between first housing surface 46 and the bottom of inlay 36 (e.g., second inlay surface 52). For example, switch 68 may be disposed in recess 70 on second inlay surface 52. In other embodiments, switch 68 may be disposed directly on second inlay surface 52 (i.e., not within a recess).

Figure 10:
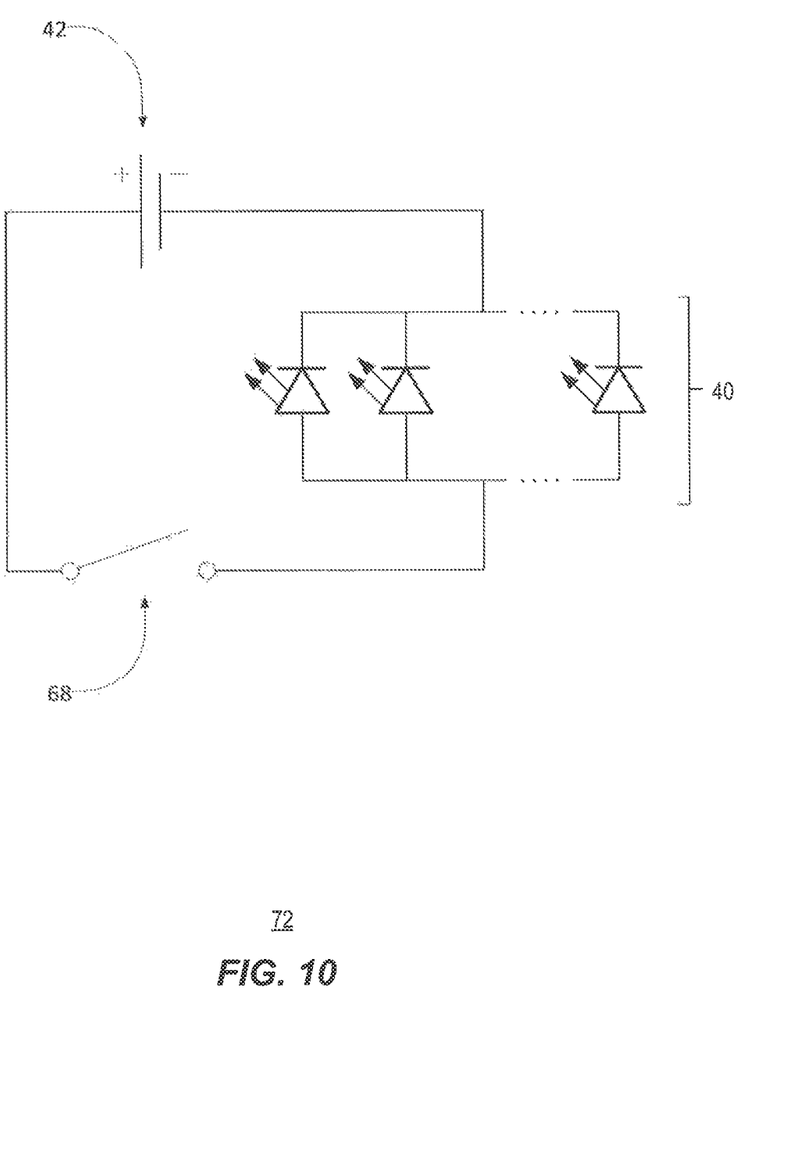
FIG. 10 is a schematic illustration of an exemplary electrical circuit, consistent with disclosed embodiments.

FIG. 10 shows a schematic illustration of an exemplary circuit 72 consistent with embodiments of the present disclosure. As shown, light source 40 may be electrically connected to power source 42 (e.g., via wires, flat wires, printed conductors, a circuit board, etc.). Switch 68 may be electrically connected to light source 40 and power source 42, and may be configured to activate and deactivate the light source by connecting and disconnecting light source 40 from power source 42. It should be understood that other circuit components may also be included, such as capacitors, resistors, memory, a processor, etc. Light source 40 may include a plurality of light sources (e.g., LEDs) connected in parallel to power source 42 (e.g., by a bus or other conductive component). In other embodiments, one or more light sources may be connected in series.

In some embodiments, power source 42 may be or include one or more batteries. For example, power source 42 may include a lithium-ion battery or other type of non-rechargeable or single-use battery. Batteries used in power source 42 may be thin and flexible. For example, commercially available flexible lithium batteries less than 2 mils thick may be used. Battery thickness may exceed 2 mils depending on the thickness of card 28 and of its components (e.g., inlay 36 and housing 34). The lifespan of a non-rechargeable battery may be determined by type and quantity of light sources 40 included in card 28.

Figure 11A:
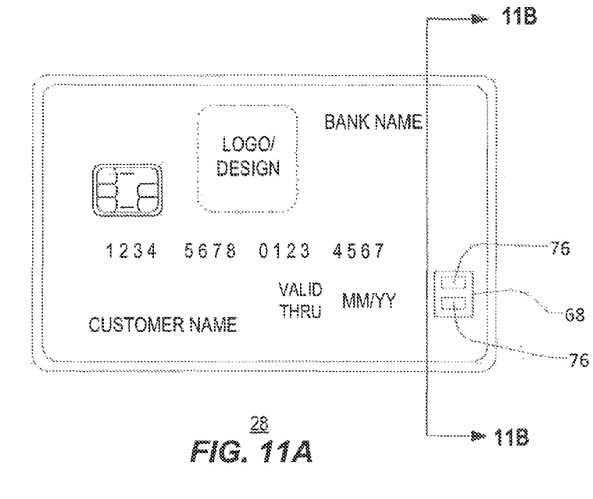
FIG. 11A is a front view of an exemplary transaction card showing section line 11B-11B, consistent with disclosed embodiments.
Figure 11B:
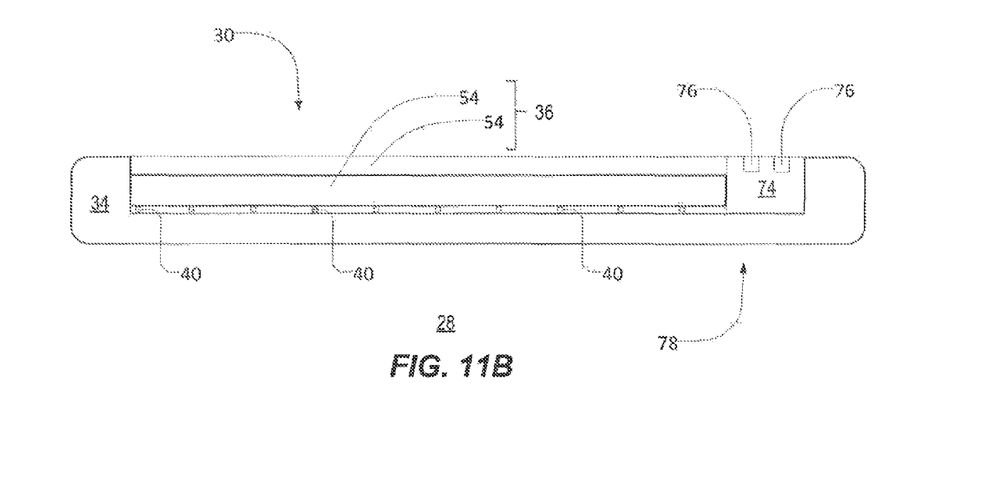
FIG. 11B is a cross-sectional view of the exemplary transaction card of FIG. 11A taken along section line 11B-11B, consistent with disclosed embodiments.

In another embodiment, with reference to FIGS. 11A-11B, card 28 may include a rechargeable power source 74. FIG. 11A illustrates card 28 with a section line 11B-11B along its width. FIG. 11B is a magnified cross-sectional view of card 28 along line 11B-11B. In embodiments consistent with the example of FIG. 11B, rechargeable power source 74 may be disposed on or in housing 34 and configured to supply power to the light source. Rechargeable power source 74 may be or include, for example, a lithium polymer battery or other type of rechargeable or multiple-use battery. Batteries used in rechargeable power source 74 may be thin and flexible. For example, commercially available flexible lithium polymer batteries less than 2 mils thick may be used. Battery thickness may exceed 2 mils depending on the thickness of card 28 and of its components (e.g., inlay 36 and housing 34). Rechargeable battery 74 may include charging electrodes 76 configured to conduct an electrical current from a charging device into rechargeable battery 74. Charging electrodes 76 may be configured to be exposed, for example, at front surface 30 of card 28. In other embodiments, charging electrodes 76 may be exposed at a rear surface 78 opposite front surface 30.

Figure 12:
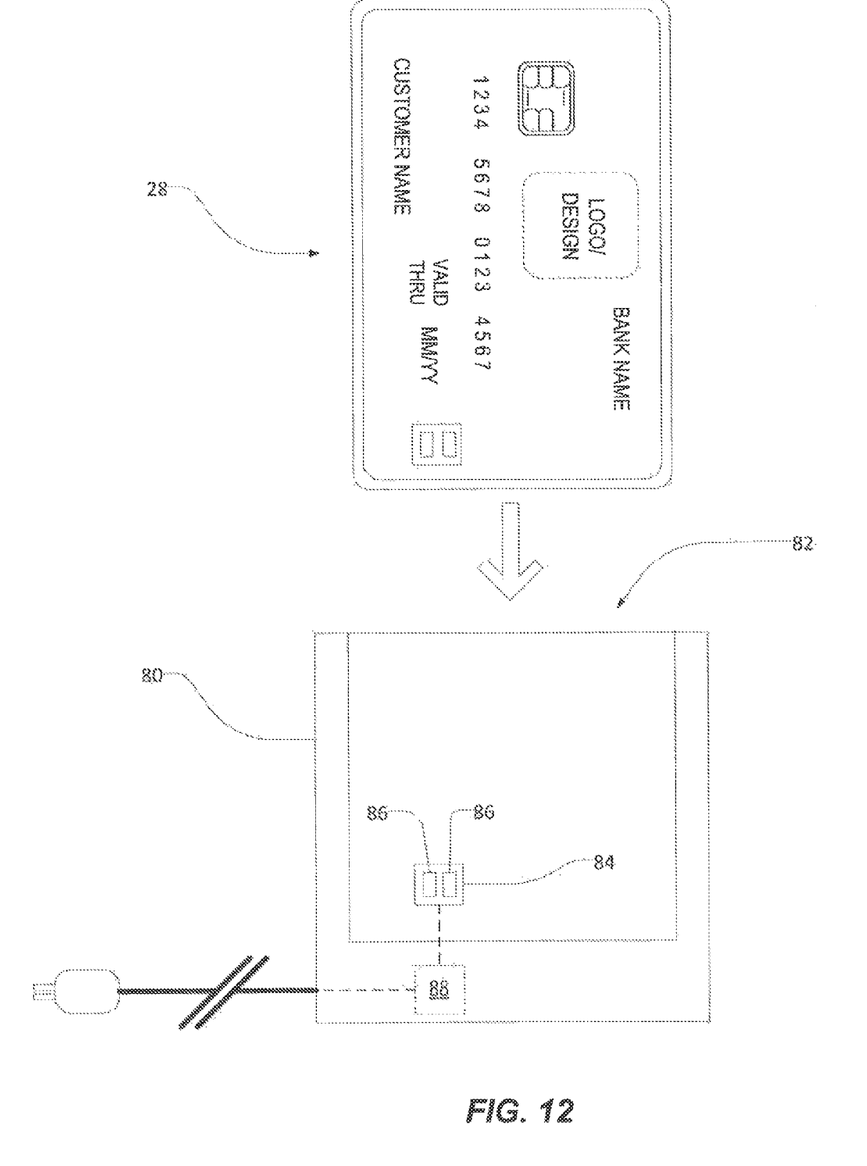
FIG. 12 is a front and cross-sectional view illustration of an exemplary transaction card having a rechargeable power source, and a charging device, consistent with disclosed embodiments.

FIG. 12 shows a schematic illustration of an exemplary charging device 80 configured to receive card 28 for charging rechargeable battery 74. In the example of FIG. 12, charging device 80 may be configured to receive card 28 through an open end 82. A charging terminal 84 may be disposed on or in charging device 80 and include charging electrodes 86 configured to engage charging electrodes 76 of card 28. Charging device 80 may include a charging circuit 88 for conditioning electrical current from an external power source. It should be noted that card 28 and charging device 80 may be configured to utilize other configurations or types of charging systems, such as inductive charging systems, solar power systems (e.g., solar panel or thin-film solar power systems), and/or other types of charging systems.

In some embodiments, card 28 may include an internal power generator to charge rechargeable battery 74. For example, card 28 may include a kinetic generator, such as a micro-generator (e.g., a claw-pole generator, a lavet generator, an air coil generator, oscillating mass generator, piezoelectric material generator, etc.). In other embodiments, card 28 may include a thermoelectric generator, such as a semiconductor-type thermoelectric generator configured to generate electricity from a temperature gradient. In such embodiments, a user may be able to place one side of card 28 on a hot or cool surface (relative to the other side of card 20) to charge battery 74. In other embodiments, card 28 may include solar panels or thin-film solar cells (e.g., photovoltaic materials) for harvesting solar energy. In some embodiments, light-penetrable layer 54 may comprise a transparent photovoltaic material configured to convert light energy into electricity while also allowing light to pass therethrough.

Figure 13:
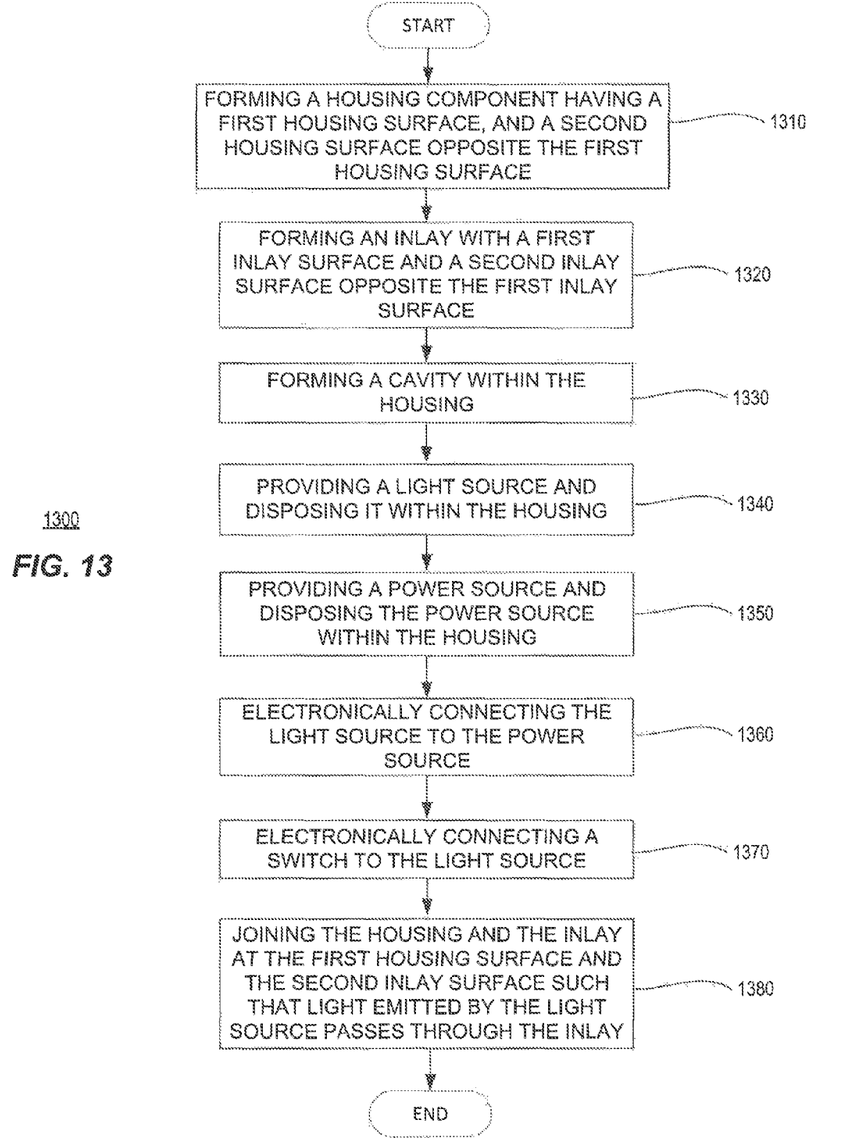
FIG. 13 is a flowchart showing an exemplary method for constructing a transaction card, consistent with the disclosed embodiments.

FIG. 13 is a flowchart showing an exemplary method/process 1300 for forming a transaction card according to some embodiments of the present disclosure. It is noted that the steps associated with method 1300 may be performed in different orders than the order in which they are numbered and/or described. Method 1300 may include forming a card housing component having a first housing surface, and a second housing surface opposite the first housing surface (Step 1310). For example Step 1310 may include forming housing 34 from PVC, PC, or other similar materials, using a manufacturing process, such as a molding process (e.g., an injection-molding process or a compression-molding process). In other embodiments, housing 34 may be formed of a resin mixture comprising one or more of a thermoplastic elastomer (TPE), polybutylene terephthalate (PBT), an acetal homopolymer, and/or other materials. In some embodiments, the TPE and/or other materials may be selected to provide card 28 with a "soft-touch feel" (i.e., a haptic sensation that occurs when a person touches something that, for example, feels soft, smooth, and/or satiny). In some embodiments, method 1310 may include forming housing 34 from a resin mixture comprising a polyester elastomer, a block copolymer, a thermoplastic olefin, an elastomeric alloy, a thermoplastic polyurethane, a thermoplastic copolyester, or a thermoplastic polyamide. In some embodiments, housing 34 may be non-opaque (e.g., translucent, transparent, clear, etc.). That is, housing 34 may be formed of a material that is or becomes non-opaque after manufacturing is complete (e.g., after setting)

Method 1300 may further include forming light-penetrable inlay 34 with first inlay surface 50 and second inlay surface 52 opposite first inlay surface 50 (Step 1320). In some embodiments, inlay 34 may be formed as a unitary component, as shown in FIG. 4A, for example, using a molding process, a stamping process, a sheet forming process, or another manufacturing process. In other embodiments, Step 1320 may include forming inlay 34 by forming and joining backer layer 56 and light-penetrable layer 54. Backer layer 56 and light-penetrable layer 54 may each be respectively formed using a molding process, a stamping process, a sheet forming process, or another manufacturing process. Step 1320 may also include joining backer layer 56 and light-penetrable layer 54, for example, using epoxy or a lamination process. In some embodiments, a reflective coating may also be provided on backer layer 56 during step 1320 to allow light to be reflected through light-penetrable layer 54. In some embodiments, step 1320 may further include providing visual details of card 28, such as personal information, on light-penetrable layer 54 and/or backer layer 56, such as by etching, sanding, laser-etching, carving, printing, milling, stamping, etc.

As used herein, the term "forming" with regard to steps of forming or manufacturing components or subcomponents of card 28 may include providing such components or subcomponents (e.g., by providing commercially available or commissioned components).

Method 1300 may further include forming cavity 62 within housing 34 (Step 1330). Step 1330 may include forming cavity wall 64. In some embodiments, cavity 62 may be formed when housing 34 is formed (i.e., formed during the forming process of housing 34). In other embodiments, step 1330 may be a separate process that includes subsequently forming cavity 64 within housing 34, such as by milling, laser cutting, etc.

Method 1300 may further include providing light source 40 and disposing it on or in card housing 34 (Step 1340). In some embodiments, step 1340 may include providing an electronic, photoluminescent (i.e., "glow in the dark"), or other type of device configured to emit light from housing 34 (e.g., from cavity 62). For example, in some embodiments, step 1340 may include providing one or more light emitting diodes (LED) or another type of electronic light source, such as an incandescent or fluorescent source. In other embodiments, step 1340 may include providing a photoluminescent material, such as a photoluminescent coating (e.g., a photoluminescent epoxy or paint) on one or more of first housing surface 46, top surface 58 of backer layer 56, or second inlay surface 52. Alternatively, a photoluminescent pigment or other photoluminescent material may be added to inlay 36 during its formation. In some embodiments, step 1340 may include providing multiple light sources 40, which may be configured to emit different colors of light.

In some embodiments, with reference to FIG. 5, step 1340 may include providing light source(s) 40 between inlay 36 and housing 34 (e.g., between first housing surface 46 and second inlay surface 52). In other embodiments, with reference to FIG. 6, step 1340 may include providing light source(s) between top surface 58 of backer layer 56 and a bottom surface 60 of light-penetrable layer 54. In other embodiments, step 1340 may include providing light source(s) 40 between inlay 36 and housing 34 by disposing light source(s) 40 on (e.g., directly on or in a recess on) cavity wall 64, as shown in FIG. 7B.

Method 1300 may further include providing a power source (e.g., non-rechargeable power source 42 or rechargeable power source 74) and disposing the power source on or in housing 34 (step 1350). The method may further include electronically connecting light source(s) 40 to the power source (Step 1360) via a bus or other conductor. In some embodiments, the method may further include electronically connecting switch 68 to light source 40 (Step 1370) (e.g., between light source(s) 40 and the power source) for activating and deactivating light source 40.

Method 1300 may further include joining housing 34 and inlay 36 at first housing surface 46 and the second inlay surface 52 such that light emitted by light source 40 passes through inlay 30 (Step 1380). As described above, and with reference to FIGS. 4A-4B, housing 34 and inlay 36 may be joined with light source(s) 40 between inlay 36 and housing 34, or with light source(s) 40 between light-penetrable layer 54 and backer layer 56. In some embodiments, and with reference to FIG. 7B, housing 34 and inlay 36 may then be joined with light sources 40 between inlay 36 and cavity wall 64 of housing 34. Inlay 36 and housing 34 may be joined, for example, using an epoxy or other joining method, as described above.

While illustrative embodiments have been described herein, the scope includes any and all embodiments having equivalent elements, modifications, omissions, combinations (e.g., of aspects across various embodiments), adaptations or alterations based on the present disclosure. For example, the order of the steps of the above exemplary method may be rearranged in any preferred or suitable order, or any step may be removed or added.

The elements in the claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card, comprising:
   a front outer surface;
   a rear outer surface opposite the front outer surface;
   a housing component having a first housing surface, and a second housing surface opposite the first housing surface;
   a light source;
   an inlay component having a first inlay surface, and a second inlay surface opposite the first inlay surface;
   wherein the light source is disposed between the housing component and the inlay component; and
   wherein the housing component and the inlay component are joined via the first housing surface and the second inlay surface such that light emitted by the light source passes through the inlay, the second housing surface being the rear outer surface, and the first inlay surface being the front outer surface of the transaction card.

2. The transaction card of claim 1, wherein the light source is disposed on or in the housing component.

3. The transaction card of claim 1, wherein the inlay component comprises:
   a light-penetrable layer; and
   a backer layer joined to the light-penetrable layer.

4. The transaction card of claim 3, wherein the light source is disposed between the light-penetrable layer and the backer layer.

5. The transaction card of claim 1, wherein:
   the housing component includes a cavity having a cavity wall; and
   the light source is disposed between the cavity wall and the inlay component.

6. The transaction card of claim 1, further comprising a switch electronically connected to the light source and configured to activate and deactivate the light source.

7. The transaction card of claim 1, further including a power source disposed within the card hosing and configured to supply power to the light source.

8. The transaction card of claim 7, wherein the power source is a rechargeable power source.

9. The transaction card of claim 1, wherein the light source is a light emitting diode.

10. The transaction card of claim 1, wherein the light source is a photoluminescent material.

11. A method of manufacturing a transaction card having a front outer surface and a rear outer surface opposite the front outer surface, comprising:
    forming a housing component having a first housing surface, and a second housing surface opposite the first housing surface;
    forming an inlay component having a first inlay surface, and a second inlay surface opposite the first inlay surface;

providing a light source disposed between the housing component and the inlay component; and joining the housing component and the inlay component via the first hosing surface and the second inlay surface such that light emitted by the light source passes through the inlay component, the front outer surface of the transaction card being the first inlay surface, and the rear outer surface of the transaction card being the second housing surface.

12. The method of claim 11, wherein the light source is disposed on or in the housing component.

13. The method of claim 11, wherein forming the inlay component includes:

providing a light-penetrable layer and a backer layer; and joining the light-penetrable layer and the backer layer.

14. The method of claim 13, wherein the light source is disposed between the light-penetrable layer and the backer layer.

15. The method of claim 11, further comprising forming a cavity within the card housing, wherein:

the cavity includes a cavity wall; and the light source is disposed between the cavity wall and the inlay component.

16. The method of claim 11, further comprising connecting a switch to the light source, wherein the switch is configured to activate and deactivate the light source.

17. The method of claim 11, further comprising providing a power source disposed within the housing component, the power source being configured to supply power to the light source.

18. The method of claim 17, wherein the power source is a rechargeable power source.

19. The method of claim 11, wherein the light source is a light emitting diode.

20. The method of claim 11, wherein the light source is a photoluminescent material.

* * * * *

UNITED STATES PATENT AND TRADEMARK OFFICE
CERTIFICATE OF CORRECTION

PATENT NO. : 10,002,318 B1
APPLICATION NO. : 15/691079
DATED : June 19, 2018
INVENTOR(S) : Om J. Suthar Page 1 of 1

It is certified that error appears in the above-identified patent and that said Letters Patent is hereby corrected as shown below:

In the Claims

Claim 11, Column 15, Line 4, "via the first hosing surface" should read -- via the first housing surface --.

Signed and Sealed this
Twenty-eighth Day of May, 2019

Andrei Iancu
*Director of the United States Patent and Trademark Office*